Dec. 15, 1931.  R. D. EVANS  1,837,033
PROTECTIVE RELAY SYSTEM USING REACTORS
Filed Sept. 7, 1927   3 Sheets-Sheet 1

INVENTOR
Robert D. Evans
BY
ATTORNEY

Dec. 15, 1931.    R. D. EVANS    1,837,033
PROTECTIVE RELAY SYSTEM USING REACTORS
Filed Sept. 7, 1927    3 Sheets-Sheet 2

INVENTOR
Robert D. Evans
BY
ATTORNEY

Dec. 15, 1931.  R. D. EVANS  1,837,033
PROTECTIVE RELAY SYSTEM USING REACTORS
Filed Sept. 7, 1927  3 Sheets-Sheet 3
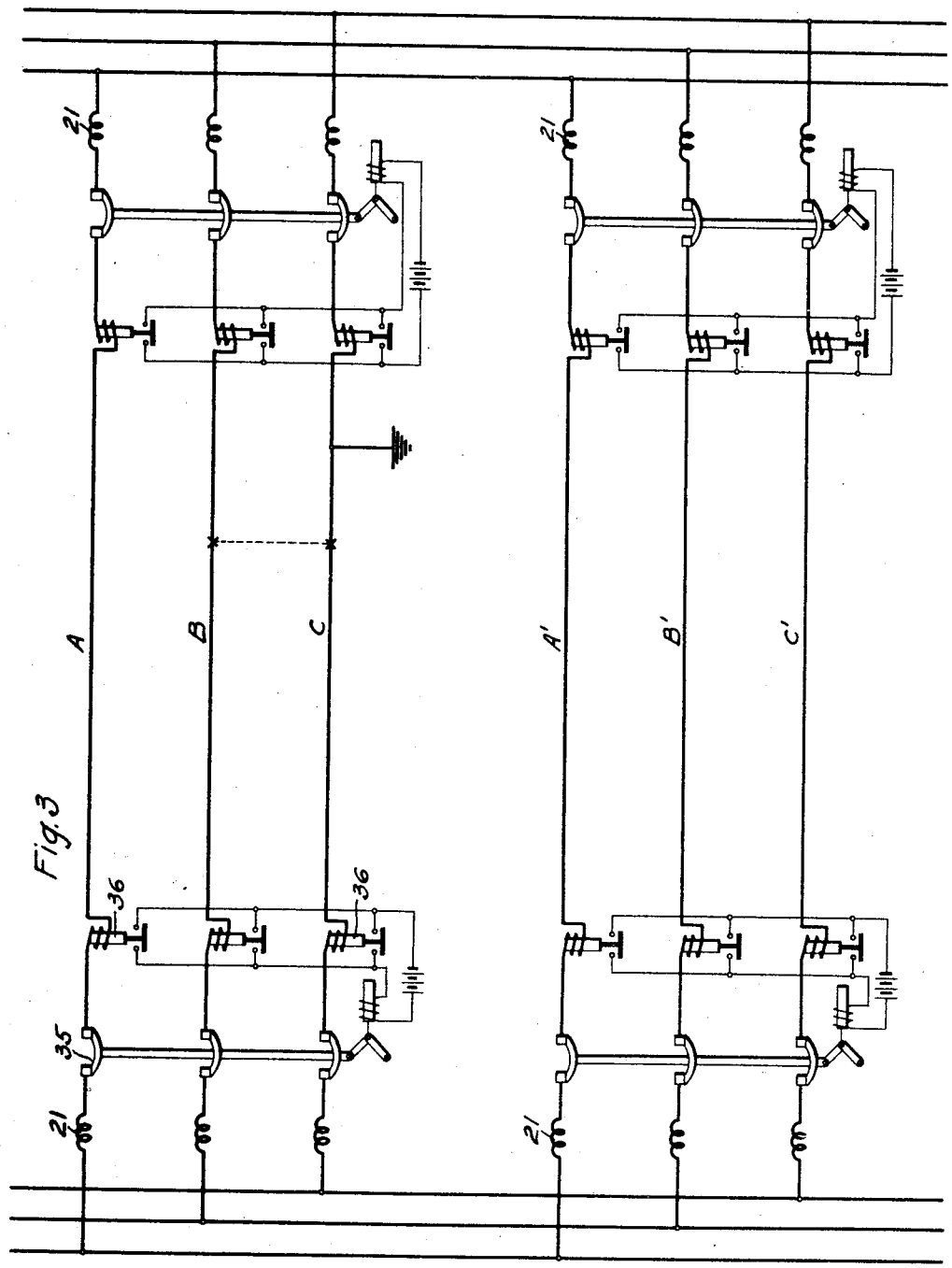
INVENTOR
Robert D. Evans
BY
ATTORNEY Patented Dec. 15, 1931

1,837,033

UNITED STATES PATENT OFFICE

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA

PROTECTIVE RELAY SYSTEM USING REACTORS

Application filed September 7, 1927. Serial No. 218,103.

This invention relates to protective-relay systems and particularly to such systems using impedance devices in power conductors.

One object of this invention is to provide an inexpensive means for obtaining selective circuit-breaker control on parallel connected systems.

Another object of this invention is to minimize the inductive effects in neighboring communication circuits arising from fault disturbances in a power system.

Another object is to minimize the duration of a fault condition on a power system.

Another object is to provide a fully selective protective system by the use of impedance devices on power circuits.

Another object of this invention is to provide a protective system capable of effective use with high-speed circuit interrupters.

Another object is to provide simultaneous operation of circuit breakers at both ends of a faulty conductor or line.

Another object is to provide a system which shall isolate only the faulty conductor without causing false operation in an adjacent or parallel or other non-faulty conductors.

Another object is to increase the tolerance in relay adjustment without false operation of isolating devices.

Another object is to prevent, by means of reactors or other impedance devices, the effect known as "cascading."

Another object is to insure such difference in current between the good and the faulty conductors or lines that the relay can easily discriminate between them for any or all locations of a fault, and especially for a fault occurring near a bus.

Another object is to reduce the shock on an equipment when a severe short circuit occurs.

Another object is to provide a protective system for selectively isolating only the faulty conductor when the fault occurs near the end of the conductor, i. e., near the station bus.

This invention involves the use of reactors or other impedance devices on parallel power circuits for the purpose of obtaining a fully selective protective system. The reasons for using such impedance devices will be brought out later, as the various elements entering into the problem are described.

One of the important considerations in the design of a distribution system is the matter of inductive effects in neighboring communication circuits, particularly commercial communication circuits, in contradistinction to the power company's or the railroad's own communication circuits. The most severe conditions for these commercial circuits arise at times of faults on the distribution system which cause relatively high induced voltages to appear in these neighboring communication circuits. The induction is relatively high in a railway system where the rails are utilized for return paths, and there is a considerable leakage from the rails into the earth, so that a large loop is formed for the flow of the propulsion current supplied by a trolley wire, an appreciable part returning through the earth at an equivalent depth of perhaps 1000 ft. below the surface of the earth. This wide loop is responsible for the relatively high voltages induced in the communication circuits for a definite short-circuit current and length of parallel.

The duration also of the fault condition on the railway circuits is important with respect to the inductive effects experienced in neighboring communication circuits. For this reason, the interference conditions will be considerably improved if the faulty sections of the railway distribution system are disconnected in the shortest possible time. This time is usually about one cycle on a 25 cycle circuit, though, under certain favorable conditions, it may be accomplished within ½ cycle from the inception of the short circuit until all breakers connected to the faulty section of line are open. The reason why breaker operation earlier than the second zero current value after a short-circuit is not, in general, to be attempted is that the rate of increase in the length of the arc would be so great that many of the breaker openings would result in the extinction of the arc at a high-current point on the current wave, thus imposing a heavy surge on the line. For this reason, the minimum practicable time required for opening the breaker is determined more by the frequency of the propulsion circuit than any other consideration. In other words, with a higher-frequency power supply, faster disconnection of the faulty section of the line may be obtained.

In order to obtain the full advantages of high-speed-breaker operation, it is necessary to disconnect all breakers connected to the faulty section of the line, and this introduces a difficult problem in selective relaying. It is an easy matter, for example, to provide over-current relays which will trip out one breaker close to the short circuit when that breaker is carrying a current much in excess of the normal load current. Assuming the usual connections of supplying the different trolley conductors from a common bus at each station, for the above condition, the breakers at the remote end of the section will be carrying a current of relatively small value, and the current in the sound lines will be the same as in the faulty line, as is illustrated in Fig. 1 (a). This makes it difficult or impossible to find a differentiation on the basis of overcurrent alone.

Another difficulty in the relaying problem arises from the fact that the rate of change of current alone cannot be used to differentiate between normal operating conditions and fault conditions; for example, energizing of a car transformer or the bouncing of a trolley on a motor-generator locomotive will cause a rate of change of current comparable to the rate of change that obtains in the event of a short circuit on some portions of the contact system.

The foregoing description of the difficulties experienced in securing selective relaying on a railway distribution circuit applies also to power systems. There is, however, another condition which normally arises on railway circuits, but rarely arises on power circuits, that is, the condition of taking variable loads at variable or fixed intermediate points between principal substations. Such load equipment will act more or less as an admittance during the transient conditions following the application of a short circuit, and will draw current from the railway contact line or system. This current is superposed on the current due to the short circuit which is likely to make the current in the non-faulty trolley to which the motive power equipment is connected larger than the current in the faulty trolley in the event of a short circuit occurring at the next substation as is illustrated in Fig. 1 (b).

A further complication in the relaying problem arises from the fact that the generating capacity varies with the load conditions, so that it is difficult to secure a single setting of over-current relays giving the proper selective action. For example, if relays are set low to take care of small generator capacity, they will trip out under heavy loads; and, if set high to take care of large generator capacity, protection will not be obtained when the generator capacity is reduced.

In order to obtain the maximum benefits of high-speed-circuit-breaker operation and to provide the maximum protection to adjacent communication circuits, it is necessary to abandon cascade operation of breakers which is usually employed by both power and railway companies in order to discriminate between sound and faulty lines for faults occurring close to a bus at the other end of any given section. By cascade operation of breakers is meant the use of a scheme which requires the breaker at one end of a section conductor to trip before selective action of the relay action at the other end can be made. With such a scheme the breaker nearest the fault has by far the heaviest current and is opened first. This leaves the faulty-section conductor supplied by current from only one end, which is finally isolated, usually, by a relay set for a relatively low over-current value, with a relatively long time setting. It should be appreciated that the induction conditions are quite severe after the breaker closest to the short circuit is tripped out, because the fault will then be fed "stub end" from the adjacent substation, thus bringing about a condition generally known to be severe from the induction-interference standpoint, a condition which on two-track railroads is usually the most severe that can occur.

A further requirement for selective action of the protective system is this: That all the necessary breakers required for disconnecting the faulty section of line should be operated, and in addition, that no other breaker should be operated. This requirement makes impossible the use of over-current relays alone to obtain selective action on railway or power circuits employing lines in parallel between station busses.

The above statements of the requirements of a protective system have been given in terms of the protection of adjacent communication circuits, but it is to be appreciated that the protective system meeting the above requirements also provides protection to the propulsion circuit in other ways. The prompt disconnection of the fault will limit the burning of wires where arcing occurs and limit the over-heating of all parts of the system due to the flow of short-circuit current. In addition, the reduction in the duration of the abnormal condition will minimize the tendency for synchronous apparatus to pull out of step.

In order to avoid the above difficulties, this invention proposes the use of reactance means or other impedance devices between the transformer-station busses and the contact line circuits. The insertion of reactance to limit the short-circuit currents in individual feeders or contact lines is old but its use in combination with a high-speed-selective-relay system in a multiple-circuit line is new. In fact, high-speed breakers capable of operating on one cycle could not heretofore be applied to multiple-circuit lines because of the impossibility of securing fully selective action with any type of over-current or equivalent relay heretofore available; without the use of my present invention, involving the combination including reactances or impedances or other equivalent means for securing simultaneous operation of the breakers at the two ends of a faulty section, instead of successive operation thereof as has been provided heretofore.

By means of an installation of reactors, it is possible to obtain simultaneous operation of circuit breakers at both ends of a faulty section of line, even when connected in parallel with other circuits between the same busses, without causing false operation of breakers on other non-faulty circuits.

One combination of apparatus to secure selective operation of breakers connected to a faulty section of line includes the following parts: A reactor or reactance means inserted at each end of parallel lines between the lines and the bus; a high-speed circuit breaker capable of completely interrupting the circuit within one-half cycle from the application of energy to its trip coils; and an instantaneous relay with an over-current element, in addition to the ordinary power or railway distribution system. The speed of the breaker and relay should preferably be such as to produce complete interruption of the circuit through the breaker within one cycle. In addition, the circuit breaker should be trip-free in any position, so that high-speed disconnection of the faulty section of line may be obtained, even in case the circuit breaker is closed in on a fault, such as would normally be done prior to inspection on a line after a circuit-breaker operation.

Referring to the drawings, Figure 1, subs. a, b, c and d illustrate a typical distribution of current and voltage in a railway contact line under different conditions, such as load, no load, and both with and without reactance means connected to the conductors, when a fault or short circuit occurs near the end of one of the contact lines.

Figure 3 illustrates this protective system applied to a three-phase power-transmission system.

*Description of construction*

Figure 2:
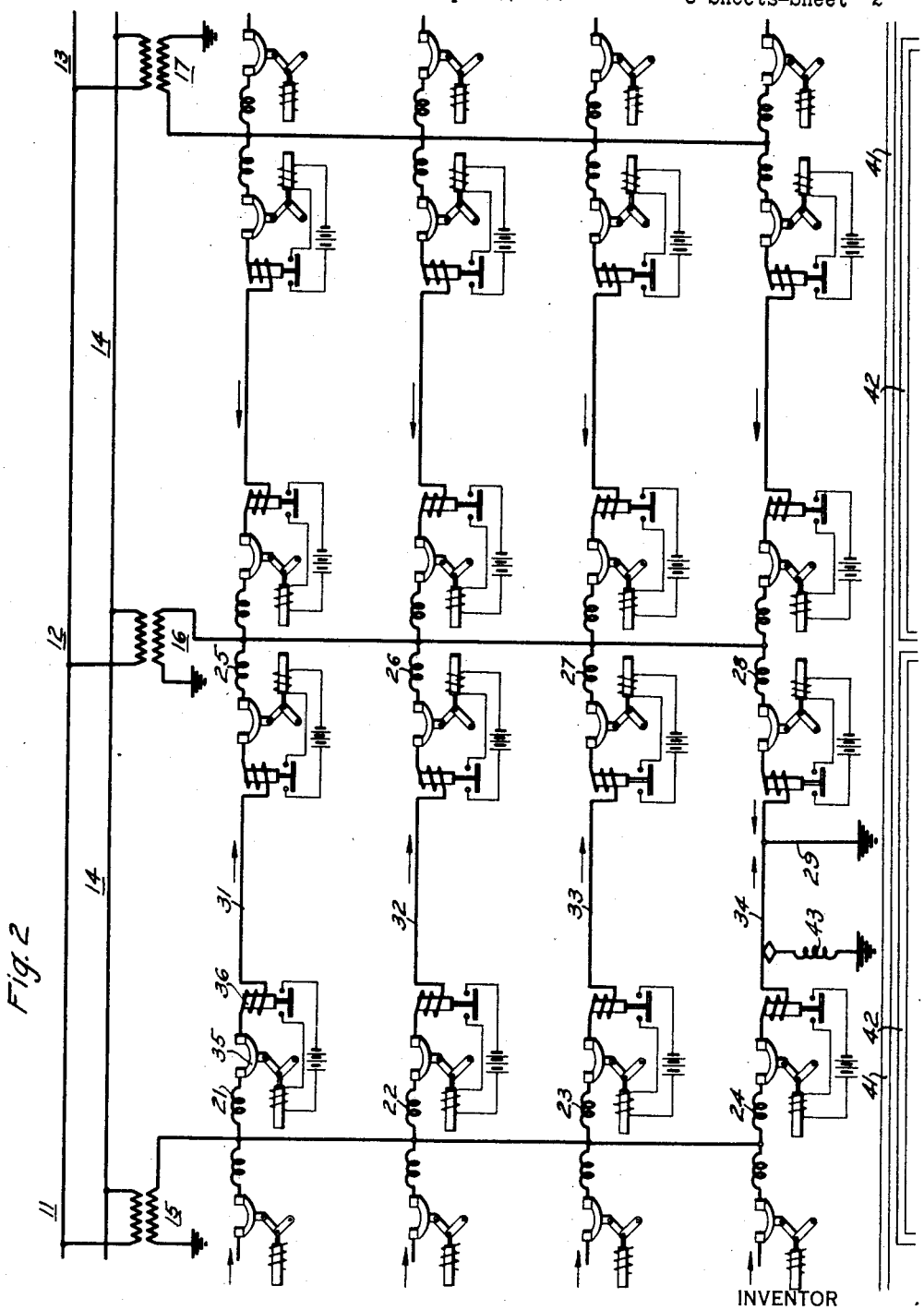
Figure 2 illustrates this protective system using the reactance means as applied to a four-track, single-phase railway system.

Referring to Fig. 2, sources of single phase alternating current are supplied through a transmission line 14 and through substations 11, 12 and 13 and step-down transformers 15, 16 and 17, respectively, to a railway contact line having four trolley conductors 31, 32, 33 and 34 in parallel-circuit relation.

Referring to the section which is fed from the sources of power 11 and 12, there are four contact lines, 31, 32, 33 and 34, connected in multiple and having a source of power supplying each end thereof. Each of the conductors 31, 32, 33 and 34 is supplied with devices variously called isolating devices, circuit interrupters or circuit breakers 35, one disposed at each end of each conductor. Associated with each circuit interrupter 35 is an actuating means and an over-current relay 36. Also, in each of the contact lines in all of the sections to be protected, is connected an impedance device, or, as represented in the particular illustration, reactors 21 to 28 inclusive. The purpose of these reactors is to provide a means for insuring a difference in fault-current distribution between the good and the faulty conductors so that the corresponding relay can discriminate between them. They may be reactors of the usual form or the reactance may be obtained by carrying the feeders back to a point removed from the end of a contact-wire section before joining it to the contact-wire, so that the reactance of the feeder is always interposed in series with the contact-wire. These inductance means 21 to 28, inclusive, are preferably placed next to the bus to operate as current-limiting reactors, in addition to serving their important function of permitting selective operation of only the faulty conductors.

Adjacent to the contact lines 31 to 34, inclusive, and parallel thereto, is shown a through-communication circuit 41 and also local-communication circuits 42, all subject to inductive disturbances that may occur in the main power system.

*Description of operation*

Under conditions of normal operation, the contact lines or conductors, 31 to 34, inclusive, are energized from the stepdown transformers 15 and 16, with alternating-current, 25-cycle, single-phase power. The circuit breakers 35 remain closed and their actuating relays 36 likewise are inactive.

When a load 43 appears on the contact lines, such as at contact line 34, current is fed through conductor 34 to the load 43, but the relays 36, having been adjusted properly, are inactive and do not respond to normal load current to actuate the circuit interrupters 35.

If a short circuit or fault 29 occurs, however, a current will flow from the sources of power 15 and 16 to the fault 29, through all of the conductors, as indicated by the arrows. To explain further, current flowing in conductor 34 from substation 11 will pass through impedance device 24. Flowing to the same fault 29 from the opposite direction, current will flow from substation 12, through a like impedance device 28. The path of current from step-down station 11 through the parallel conductor 33 will be through the impedance devices 23, 27 and 28, and consequently, such current will be reduced considerably from that flowing in conductor 34 by reason of the additional impedance inserted in series therewith. Likewise, such fault current flowing in the conductors 31 and 32 will be similarly reduced relative to the current value flowing in conductor 34. The reactors or impedance devices 21 to 28 inclusive, therefore, serve to insure a difference in fault-current distribution between the good conductors 31, 32 and 33 and the faulty conductor 34, so that the relays 36 in the conductor 34, having been adjusted for this difference in distribution of currents, will respond thereto and simultaneously interrupt circuit breakers 35 located at both ends of conductor 34. Therefore, this protective system is selective to isolate only faulty conductors and to do so simultaneously at both ends of the faulty conductor 34.

Figure 1:
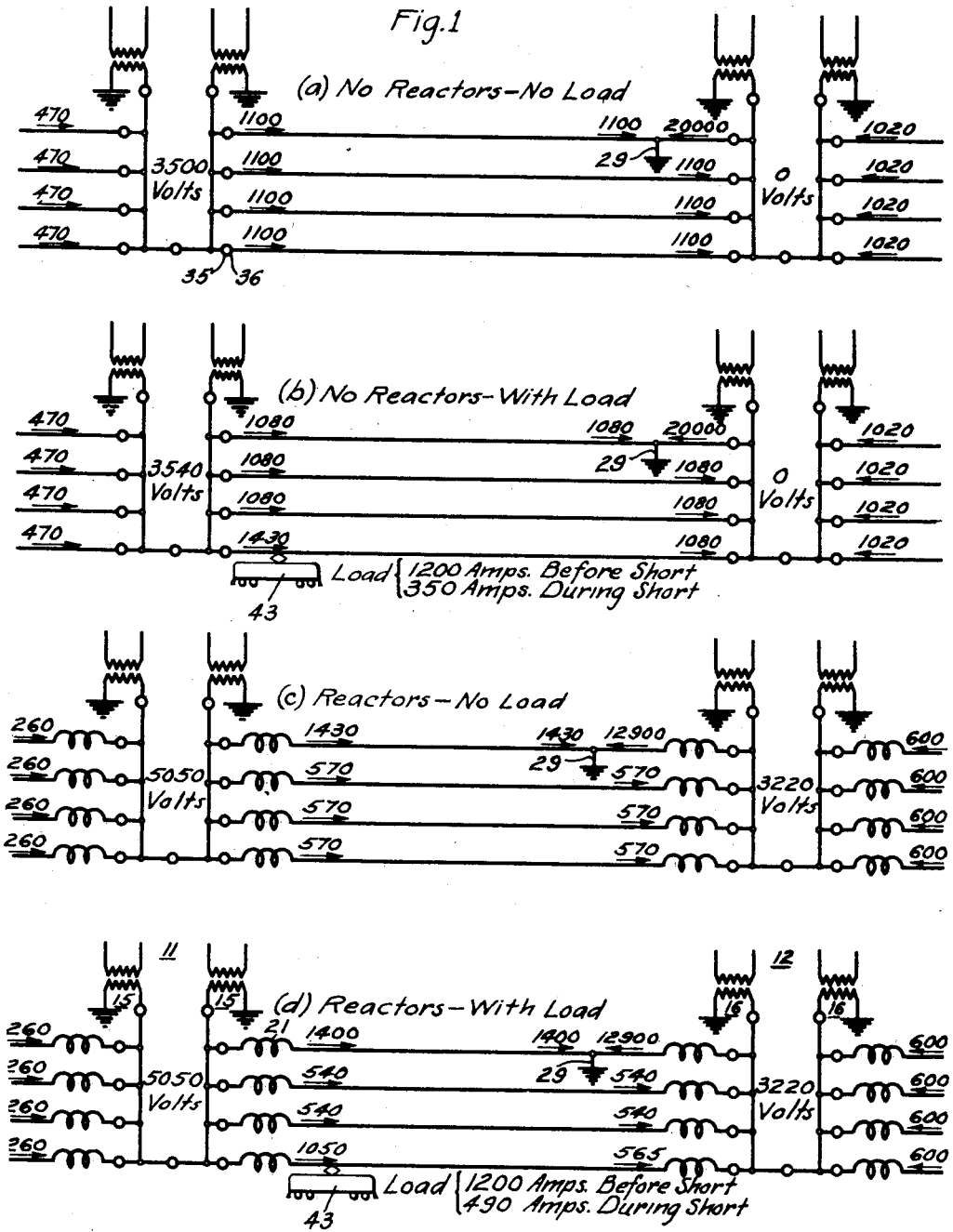

In Fig. 1, sub-divisions $a$, $b$, $c$ and $d$, typical distributions of current and voltage are shown, utilizing reactors 21 to 28 inclusive, as described. This will serve to illustrate more concretely the difference in distribution of current values that these reactors provide in order to be utilized as a means of protecting and isolating a faulty conductor.

Because this arrangement will minimize the duration of the fault condition on the power system, there will be a reduced inductive effect in neighboring communication circuits 41 and 42, 43 arising from fault disturbances on the power system. Also because of quicker operation than that obtained from the usual straight over-current relay means only, this system is capable of more effective use with high-speed circuit interrupters. Its principal advantage, however, is in isolating only the faulty conductor, without producing false operation in an adjacent, or parallel or other non-faulty conductor. However, it has other advantages than those of selectivity, that is to say, the use of reactors or other means of providing reactance, or inductance or impedance in a contact line or other power line, has the effect of reducing the shock on the equipment when a severe short-circuit occurs.

In the case of a fault on motive-power equipment, especially in the case of one occurring near a transformer station, the damage may be materially less when these impedance devices are used, thus increasing the serviceable life of the equipment and decreasing maintenance.

Also, the inductive interference resulting from closing in on a faulty line, will be reduced by the use of inductance means or these impedance devices. It is not possible in practice to close the two breakers on a faulty line at exactly the same instant. Hence, the closing of the first breaker will cause a "stub-end" feed with severe inductive effects on neighboring communication circuits, which effects will also be reduced when these reactances are used.

The system has been described as applied to a single-phase railway system. However, it may be applied to power systems generally and particularly to all alternating-current power systems. As applied to a three-phase power system, as illustrated in Fig. 3, its operation is identical with that already described. That is to say, the impedance devices 21 installed near the end of each conductor serve as a means for distributing fault currents so that maximum fault current will appear in only the faulty line and the relays responsive to such increased distribution of fault current will respond and isolate the faulty transmission line.

Such changes and substitutions as may be made by those skilled in the art are to be construed as within the scope of the appended claims, except as limitations may be imposed by the prior art.

I claim as my invention:

1. The combination with a plurality of conductors or lines in parallel-circuit relation energized by a source of power, circuit interrupters therefor and actuating means for the circuit interrupters, of an impedance device connected near each end of each conductor and arranged to distribute fault currents between the good and the faulty conductors and relays responsive to the differently distributed fault currents for operating the circuit interrupters in only the faulty conductor.

2. The combination with a plurality of conductors or lines in parallel-circuit relation energized by a source of power, circuit interrupters therefor, and actuating means for the circuit interrupters, of means for providing fault-current distribution between good and faulty parallel conductors, and relays responsive to the distributed fault currents for operating the circuit interrupters in only the faulty conductor.

3. The combination with a plurality of conductors in parallel-circuit relation having a source of alternating-current power applied to each end of the parallel conductors, circuit breakers therefor, and actuating means for the circuit breakers, of means for providing a difference in fault-current distribution between good and faulty parallel conductors, and relays responsive to the differently distributed currents for operating the circuit breakers in only a faulty conductor.

4. The combination with a plurality of conductors in parallel-circuit relation having a source of alternating-current power applied to each end of the parallel-connected conductors, high-speed circuit breakers therefor and actuating means for the circuit breakers, of an inductance means connected near each end of each conductor for providing a fault-current distribution between good and faulty parallel conductors, and substantially instantaneous overcurrent relays responsive to the distributed currents for operating the circuit breakers in only a faulty conductor.

5. The combination with a plurality of conductors in multiple-circuit relation in a power system, circuit interrupters therefor, and actuating means for the circuit interrupters, of an impedance device connected near each end of each of said conductors and so arranged that the impedance path to fault currents in non-faulty multiple conductors is of greater value than the impedance path to fault current in a faulty conductor, and means responsive to the difference in impedance for actuating the circuit interrupters in only the faulty conductor.

6. The combination with a plurality of conductors connected in parallel-circuit relation and each having circuit interrupters near each end thereof, of impedance means in each conductor for providing a substantial difference in impedance between a path including a part of only one conductor and a path including the last-named conductor and another of said parallel conductors, and means responsive to the path of minimum impedance for controlling the circuit interrupters.

7. The combination with a plurality of parallel-connected conductors having circuit interrupters near each end thereof, of means for predetermining the impedance value of each parallel conductor, the impedance of a path comprising a portion of one conductor being substantially less than that of a path including said conductor and another of the parallel conductors, and means responsive to the difference in impedance values of said paths for controlling the circuit interrupters in the conductor having the minimum impedance path.

8. In a multiple-circuit electrical distributing system having an alternating-current source of supply, circuit breakers for said system and actuating means for the circuit breakers, impedance means in each circuit for providing a fault-current distribution between the sound and the faulty conductors, and relay means responsive to the differently distributed fault currents to isolate only a faulty conductor simultaneously at both ends.

9. The combination with a plurality of parallel-connected conductors having an alternating-current source of supply and circuit-interrupters therefor, of means for predetermining the impedance value of each parallel conductor whereby a distribution of fault currents is effected between the sound and the faulty conductors, and relay means responsive to the differently distributed fault currents for isolating only a faulty conductor simultaneously at both ends.

10. In a transmission system, the combination with parallel-connected conductors having an alternating-current source of supply and quick-acting circuit-breaker means disposed at each end of each conductor, of means for distributing fault currents among the said conductors, and means responsive to the differently distributed fault currents for simultaneously effecting only the operation of the circuit breakers at both ends of a faulty conductor.

In testimony whereof, I have hereunto subscribed my name this 30th day of August 1927.

ROBERT D. EVANS.